(12) United States Patent
Bang-Olsen

(10) Patent No.: US 9,754,468 B2
(45) Date of Patent: Sep. 5, 2017

(54) ALARM SYSTEM FOR LUGGAGE IN A LUGGAGE COMPARTMENT IN A PASSENGER TRAIN

(71) Applicant: Trolex Aporta Limited, Cheshire (GB)

(72) Inventor: Jesper Bang-Olsen, Skodsborg (DK)

(73) Assignee: Trolex Aporta Limited, Cheshire (GB)

( * ) Notice: Subject to any disclaimer, the term of this patent is extended or adjusted under 35 U.S.C. 154(b) by 0 days.

(21) Appl. No.: 15/104,010

(22) PCT Filed: Dec. 11, 2014

(86) PCT No.: PCT/DK2014/050426
§ 371 (c)(1),
(2) Date: Jun. 13, 2016

(87) PCT Pub. No.: WO2015/090326
PCT Pub. Date: Jun. 25, 2015

(65) Prior Publication Data
US 2016/0314667 A1 Oct. 27, 2016

(30) Foreign Application Priority Data
Dec. 18, 2013 (DK) ................... 2013 00705

(51) Int. Cl.
*B60C 23/00* (2006.01)
*G08B 13/24* (2006.01)
(Continued)

(52) U.S. Cl.
CPC .......... *G08B 13/2454* (2013.01); *A45C 13/18* (2013.01); *A45C 13/24* (2013.01); *A45C 13/42* (2013.01); *G06Q 10/087* (2013.01)

(58) Field of Classification Search
CPC ..... G08B 13/2451; A45C 13/18; G06Q 10/08
(Continued)

(56) References Cited

U.S. PATENT DOCUMENTS

| 2004/0124982 A1 | 7/2004 | Kovach |
| 2005/0068168 A1 | 3/2005 | Aupperle et al. |

(Continued)

FOREIGN PATENT DOCUMENTS

| EP | 2159768 A1 | 3/2010 |
| WO | 0231629 A2 | 4/2002 |

OTHER PUBLICATIONS

International Search Report, International Application No. PCT/DK2014/050426, mailed Feb. 4, 2015, 2 pages.
(Continued)

*Primary Examiner* — Phung Nguyen
(74) *Attorney, Agent, or Firm* — Ziegler IP Law Group, LLC

(57) ABSTRACT

A system, passenger train, method and software product for assisting a passenger to monitor luggage and eventually issue an alarm. The system includes a luggage compartment with an RFID reader in connection with a train server aboard of the train. The train server is provided with information about an RFID tag attached to a piece of luggage of a specific passenger, and the train server is provided with information about the mobile device of this specific passenger. Upon detection of a piece of luggage with a registered RFID tag the train server notifies the mobile device of the passenger associated with the RFID tag and requests the passenger to confirm deposit of the luggage. The RFID reader seizes to protect the RFID tag of the deposited piece of luggage, the train server notifies the mobile device of the passenger associated with the RFID tag.

5 Claims, 6 Drawing Sheets

(51) Int. Cl.
*A45C 13/42* (2006.01)
*G06Q 10/08* (2012.01)
*A45C 13/24* (2006.01)
*A45C 13/18* (2006.01)

(58) Field of Classification Search
USPC ............ 340/447, 572.1–572.9, 539.1, 13.24; 700/231
See application file for complete search history.

(56) References Cited

U.S. PATENT DOCUMENTS

| | | |
|---|---|---|
| 2006/0109122 A1 | 5/2006 | Deeds |
| 2009/0015398 A1 | 1/2009 | Bhogal et al. |
| 2009/0219169 A1 | 9/2009 | Herwats |
| 2009/0276089 A1* | 11/2009 | Bartholomew ........ G06Q 10/02 700/235 |
| 2011/0241874 A1* | 10/2011 | Ghisani ................. A45C 13/18 340/539.32 |
| 2013/0130741 A1* | 5/2013 | Grimard ................. A45C 13/42 455/556.1 |
| 2014/0077952 A1* | 3/2014 | Boss .................. G06Q 10/0832 340/572.1 |
| 2016/0189507 A1* | 6/2016 | Rayner .............. G08B 13/1427 340/572.1 |

OTHER PUBLICATIONS

Danish Patent and Trademark Office, First Technical Examination, Application No. PA 2013 00705, mailed Aug. 11, 2014, 5 pages.
Danish Patent and Trademark Office, Second Technical Examination, Application No. PA 2013 00705, mailed Oct. 22, 2014, 2 pages.
Danish Patent and Trademark Office, Third Technical Examination, Application No. PA 2013 00705, mailed Dec. 19, 2014, 2 pages.
Danish Patent and Trademark Office, Fourth Technical Examination, Application No. PA 2013 00705, mailed Feb. 25, 2015, 2 pages.

* cited by examiner

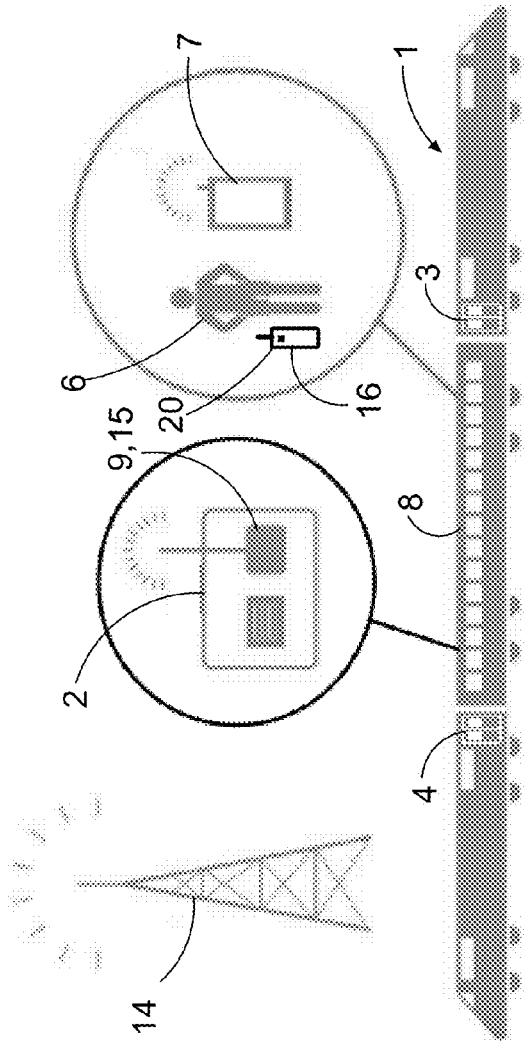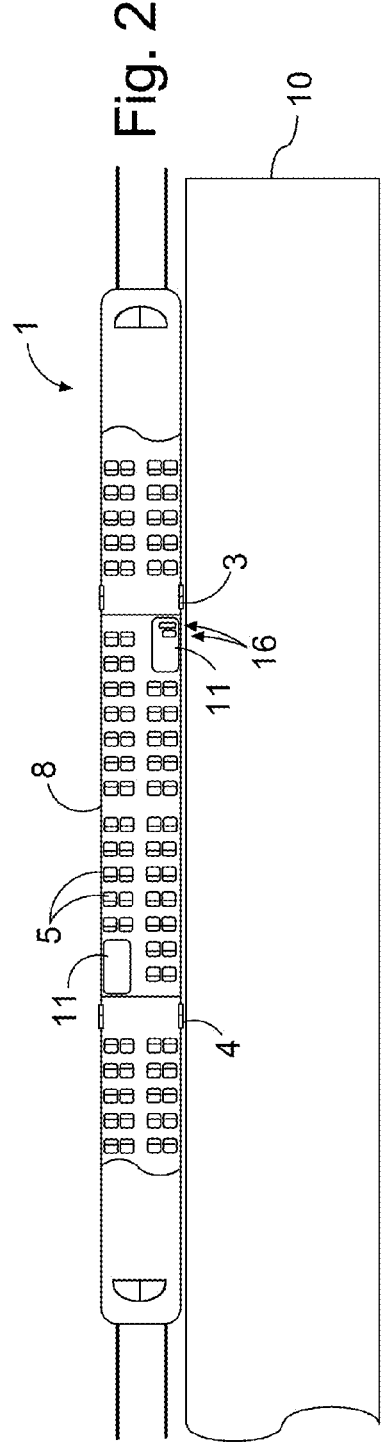

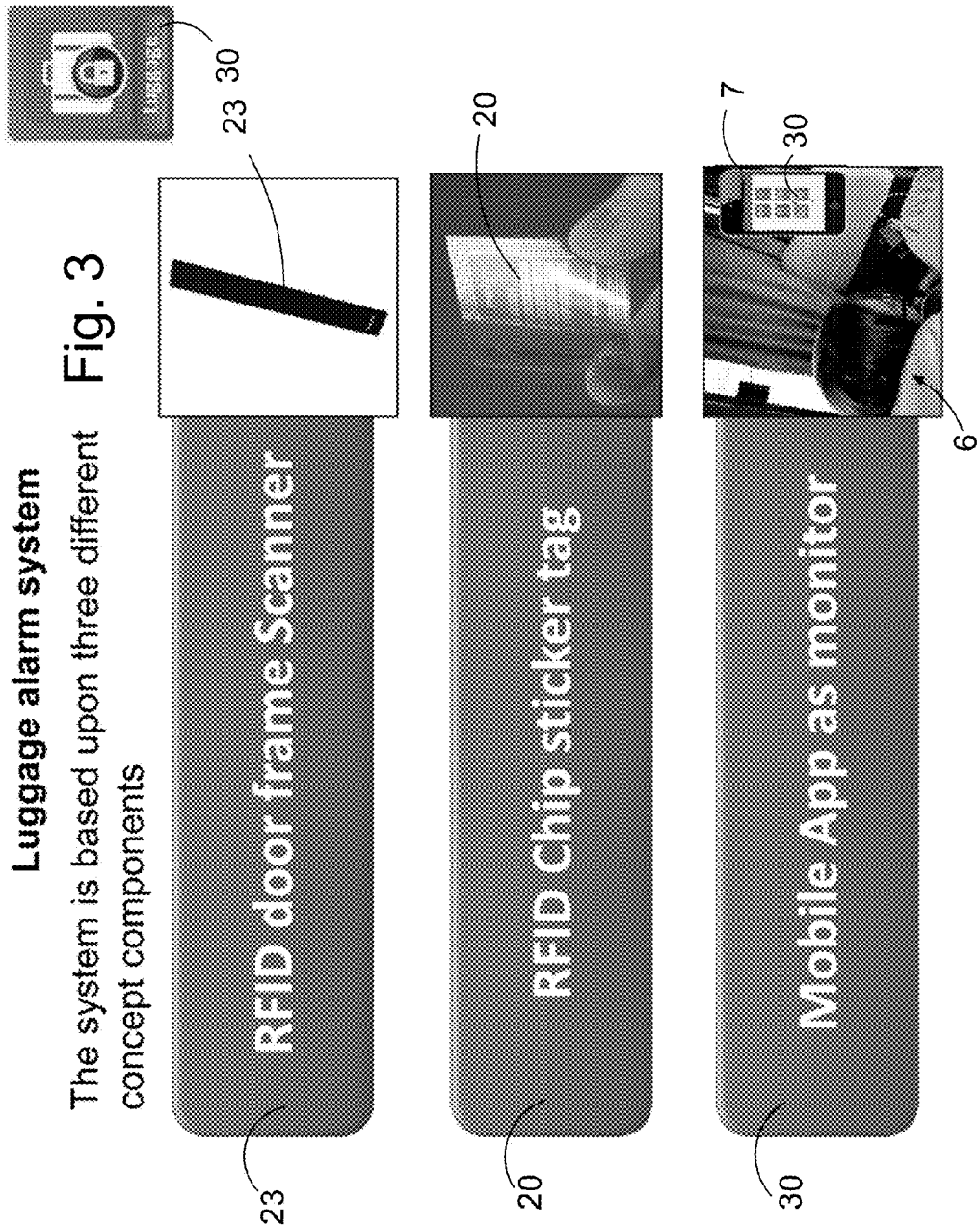

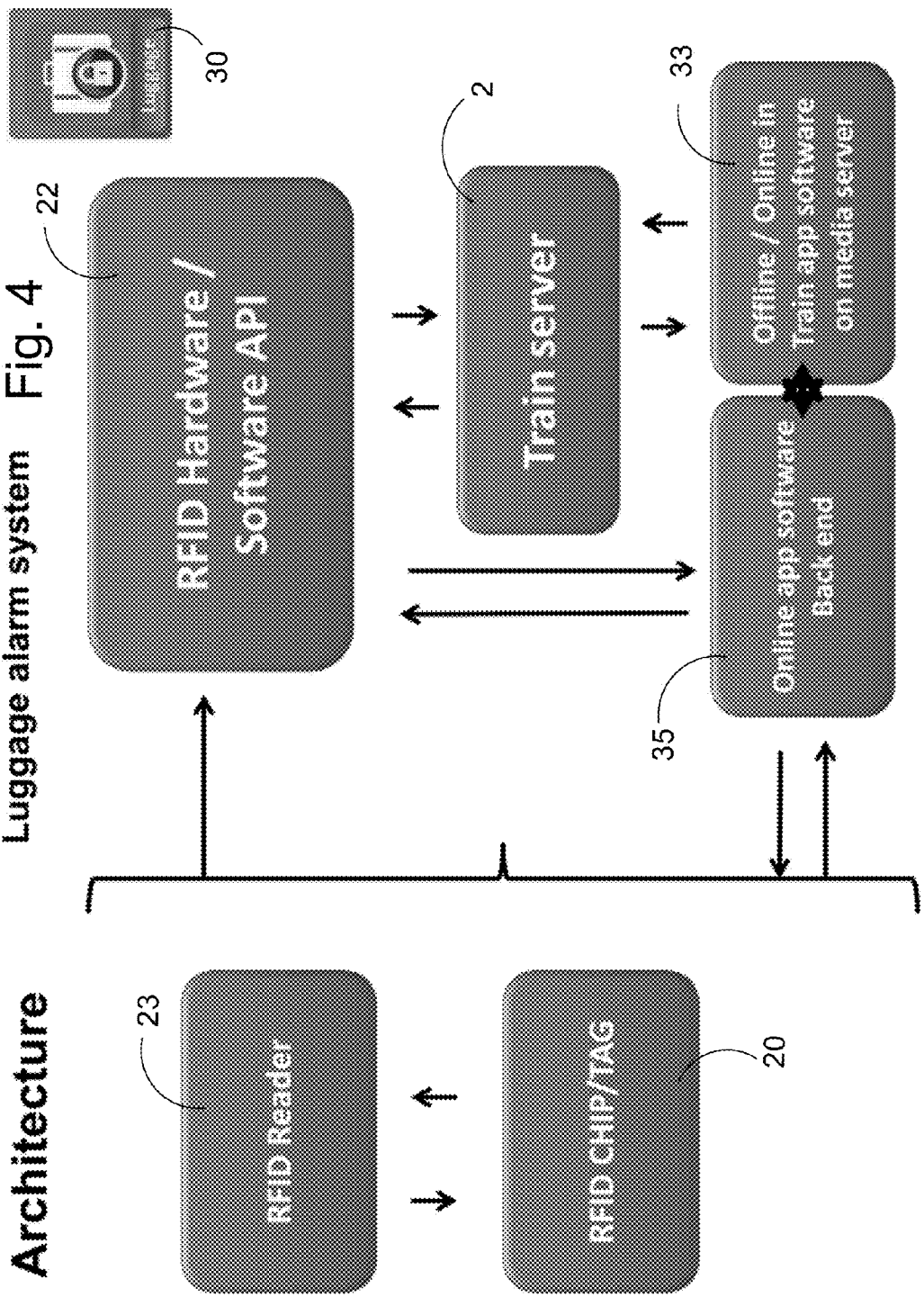

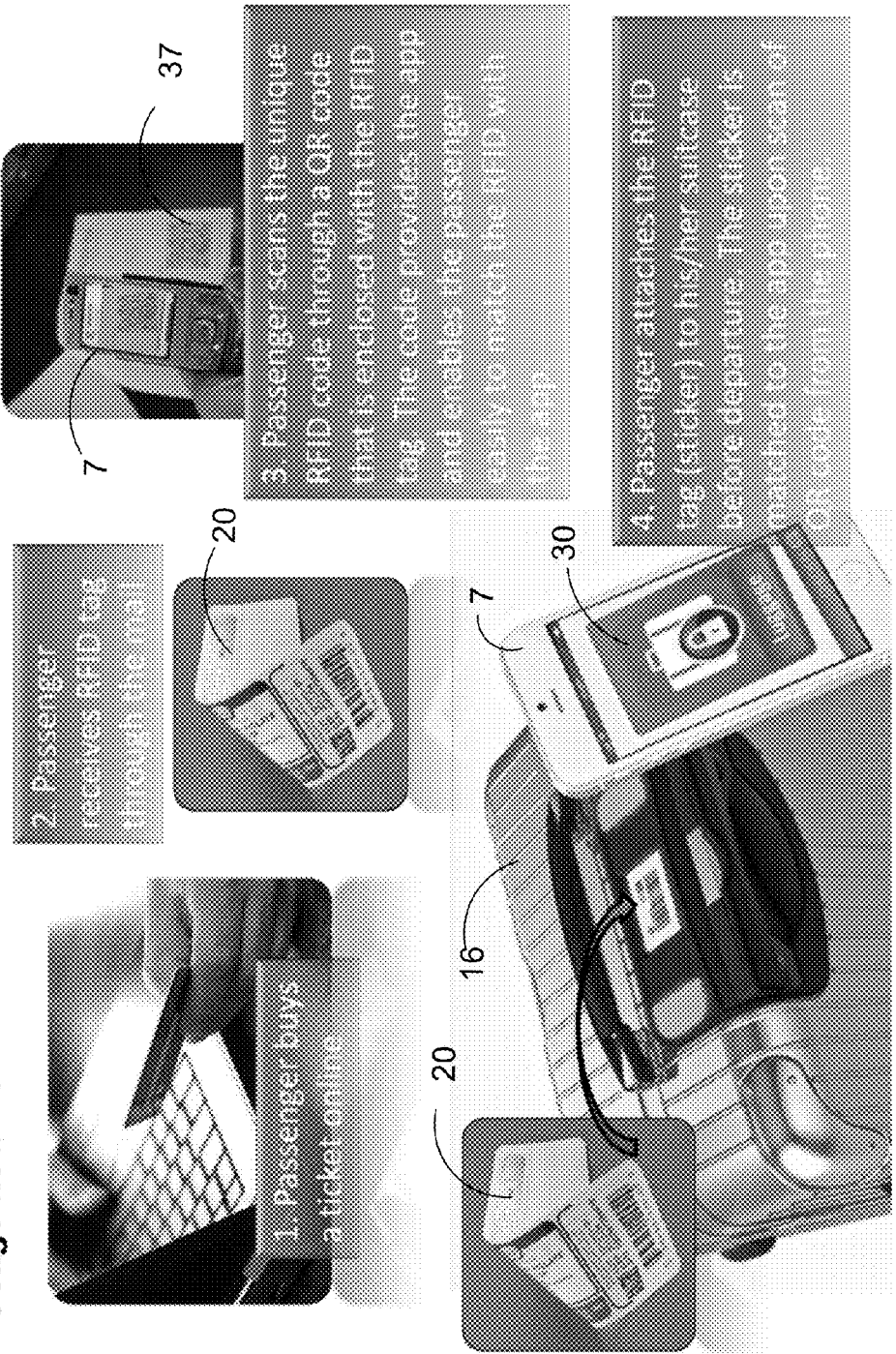

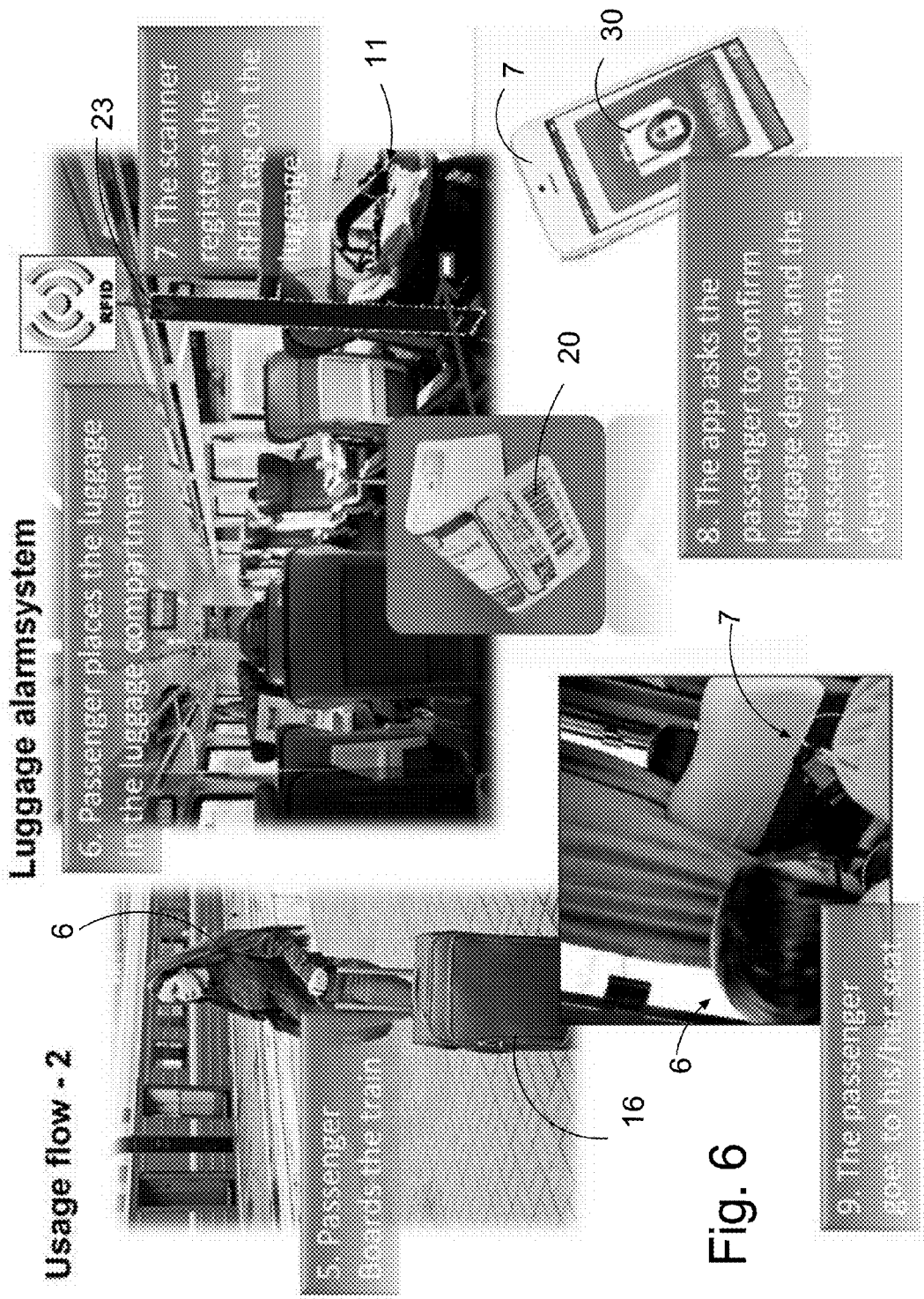

ALARM SYSTEM FOR LUGGAGE IN A LUGGAGE COMPARTMENT IN A PASSENGER TRAIN

The present application relates to a system, a passenger train, a method and to a software product that are configured for assisting a passenger in monitoring luggage in luggage compartment of a passenger train.

BACKGROUND ART

Passenger trains typically have a number of rail cars with passenger seats and luggage compartments in each of the rail cars. Passengers deposit their luggage in one of the luggage compartments and take a seat close to or less close to the luggage compartment. Passengers may during the journey visit the restroom or visit the restaurant in another railcar and made during these visits not be able to attend their luggage. If such visit coincides with a stop at a railway station there is a risk that a third-party removes and misappropriates the passenger's luggage. Therefore, passengers may feel uncomfortable leaving their luggage unattended or at of sight.

Patent Application US 2009/0276089 A1 describes an apparatus and a method for dispensing a luggage recognition label having an RFID device associated therewith that allows a passenger and/or a passenger carrier to identify and track their luggage during travel, provide access to a secure network for storing customer and travel information including a luggage inventory and itinerary information. Upon dispensing the label, the association of the unique identification code within the reader network allows access to and maintenance of information that will allow tracking of the passenger's bag. A software program running on a personal computer is designed to interface with a portable transponder and a reader. In one embodiment readers are placed within the cargo hold of a plane such that a traveler can access information regarding the location of their bag on the airplane. The reader on the plane will identify when the bag has been placed on and removed from the plane. A communication to the traveler may be made so that a traveler is assured of the location of their bag at any point in time from check-in, embarking at the point of departure, to disembarking at the point of destination. Communication is carried out wirelessly using transponders.

DISCLOSURE OF THE INVENTION

On this background, it is an object of the present invention to provide a passenger train, a method, a software product and assistant that overcomes or at least reduces the problem above.

This object is achieved by providing a passenger train, the passenger train comprising a train server on board of the passenger train, the server comprising a processor and a memory connected to the processor, at least one luggage compartment, an RFID reader arrangement connected to the train server and associated with the at least one luggage compartment and located at or in the at least one luggage compartment so as to be able to detect and read an RFID tag attached to a piece of luggage that is placed in the at least one luggage compartment, a wireless access point connected to the train server and configured for establishing a local wireless network for allowing mobile devices of passengers to access to the train server, the train server having access to a database that contains information on luggage RFID tags that have been issued to a specific passenger and information on a mobile device associated with the specific passenger, or the train server being configured to receive a message from the mobile device after the mobile device connects to the wireless network informing the train server about the RFID luggage tag associated with the mobile device, the train server being configured to register a piece of luggage as deposited in the luggage compartment associated with the RFID reader arrangement when the RFID reader arrangement concerned detects the presence of a luggage RFID tag issued to a specific passenger that is included in the database, the train server being configured to send a message to the mobile device associated with the specific passenger when the RFID reader arrangement ceases to detect the presence of the luggage RFID tag issued to the specific passenger and associated with a deposited piece of luggage.

By providing a train server that is configured to communicate directly with mobile devices on the train via a wireless network, and by ensuring that the train server is informed of the association between the RFID luggage tag and the mobile device associated with the user to whom the RFID luggage tag is issued, and by providing the mobile device associated with the user to whom the RFID luggage tag is issued with functionality for communicating with the server on the presence of the deposited luggage it is possible to provide an simple and reliable and effective system for providing alarm went luggage is removed from a luggage compartment on a passenger train.

In an embodiment the train server is configured to send a message to the mobile device of the specific passenger when an RFID tag issued to the specific passenger has been read by the RFID reader arrangement, the message preferably including information identifying the luggage compartment and/or its location and the train server preferably further being configured to include a request for the specific passenger to confirm deposit of a piece of luggage.

In an embodiment the passenger train further comprises a wireless modem for establishing a data connection to a wide area network, the train server being connected to the wireless modem and the train server being configured to regularly connect to a booking server for accessing the database with issued RFID luggage tags.

In an embodiment the train server receives information from the booking database on the train journey booked by the specific passenger, and the train server is configured to send a message to the mobile device of the specific passenger shortly before the train arrives at the destination of the specific passenger to remember the specific passenger to take his or her luggage item deposited in the luggage compartment with them when disembarking the passenger train.

The object above is also achieved by providing a method of providing guidance to a passenger of a passenger train, the method comprising providing a train server on board of the passenger train, the server comprising a processor and a memory connected to the processor, storing and maintaining in the train server a database of RFID luggage tags and mobile devices associated with specific passengers, providing a luggage compartment in the passenger train, providing an RFID reader arrangement so as to be able to detect and read an RFID tag attached to a piece of luggage that is placed in the luggage compartment, the train server verifies in the database if a specific passenger and a mobile device are associated with the RFID tag concerned when the RFID reader arrangement detects and reads an RFID tag, or the train server being configured to receive a message from the mobile device after the mobile device connects to the wireless network informing the train server about the RFID luggage tag associated with the mobile device, the train server sending a message to the mobile device associated with the specific passenger that is associated with the detected RFID tag when the RFID reader arrangement ceases to detect the presence of the RFID tag.

In an embodiment of the method the server registers a piece of luggage as deposited in the luggage compartment associated with the RFID reader arrangement when the RFID reader arrangement concerned detects the presence of a luggage RFID tag issued to a specific passenger.

In an embodiment of the method the train server is configured to issue a notification when the RFID reader arrangement concerned ceases to detect the presence of the luggage RFID tag issued to the specific passenger.

In an embodiment of the method, the method further comprises providing a wireless access point connected to the train server and configured for establishing a local wireless network for allowing passenger owned mobile devices to access to the train server.

The object above is also achieved by providing a software product for a mobile computer device, such as e.g. a mobile telephone or a tablet computer, the software product comprising a program of instructions for assisting a passenger of a passenger train to monitor a piece of luggage deposited in the passenger train, wherein the program of instructions upon being executed on the mobile computer device causes the mobile computer device to prompt a user to scan an optical machine readable code associated with an RFID tag, store the RFID tag as associated with the mobile device, send a massage to a server to identify the mobile device as associated with the RFID tag, to notify the user via the display or via the loudspeaker of the mobile device that a message has been received from a train server that the RFID tag has been read by an RFID reader associated with a luggage compartment, to prompt the user to confirm that he or she has deposited a piece of luggage in the luggage compartment, to send a message to the train server confirming the deposit of the piece of luggage, to notify the user via the display or via the loudspeaker of the mobile device that a message has been received from a train server that the RFID reader has ceased to detect the RFID tag associated with the deposited piece of luggage.

In an embodiment of the software product the program of instructions upon being executed on the mobile computer device causes the mobile computer device to further prompt the user to confirm that he or she has removed the deposited piece of luggage from the luggage compartment.

The object above is also achieved by providing a system for assisting a passenger monitoring a piece of luggage, the system comprising a server on a computer, the server comprising a processor and a memory connected to the processor, the server being configured to issue RFID luggage tags to railway passengers, and the server including a database having issued RFID luggage tags stored therein, a train server on board of a passenger train, the server comprising a processor and a memory connected to the processor, an RFID reader arrangement connected to the train server and associated with a luggage compartment and located at or in the luggage compartment so as to be able to detect and read an RFID tag attached to a piece of luggage that is placed in the at least one luggage compartment, a wireless access point on the passenger train and connected to the train server and configured for establishing a local wireless network for allowing mobile devices of passengers to access to the train server, a wireless modem on the passenger train and connected to the train server and configured for establishing a data connection to the server via a wide are network, the train server being configured to access the database via the wireless modem to obtain information on issued RFID tags and mobile devices of passengers associated therewith or the train server being configured to receive a message from the mobile device after the mobile device connects to the wireless network informing the train server about the RFID luggage tag associated with the mobile device, the train server being configured to send via the wireless network a message to the mobile device associated with the specific passenger that is associated with a detected RFID tag when the RFID reader arrangement ceases to detect the presence of the RFID tag.

In an embodiment of the system the train server is configured to register a piece of luggage as deposited in the luggage compartment associated with the RFID reader arrangement when the RFID reader arrangement concerned detects the presence of a luggage RFID tag issued to a specific passenger that is included in the database.

Further objects, features, advantages and properties of the passenger train, method, software product and system according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 1 is a diagrammatic representation of passenger train according to an example embodiment;

FIG. 2 shows the passenger train of FIG. 1 in a partially cut-open top view at a railway platform;

FIG. 3 is a diagram of components involved in an example embodiment of a luggage alarm, system;

FIG. 4 is system diagram according to an example embodiment; and

FIGS. 5 to 7 form an overview of a method and system according to an example embodiment for monitoring passenger luggage and issuing an alarm to a passenger when a luggage item is removed from a luggage compartment.

DETAILED DESCRIPTION OF PREFERRED EMBODIMENTS

In the following, example embodiments of the passenger train, system, method and software product, will be described in detail and with reference to the attached drawings.

FIGS. 1 and 2 show a passenger train 1 with a railcar 8 and a seating arrangement with a plurality of seats 5. The seats 5 are placed in a fixed arrangement and preferably said passenger seats 5 are numbered. The passenger train 1 is provided with doors 3,4 on both sides of the passenger train 1 for allowing passengers to embark and disembark the passenger train 1 when the passenger train 1 stops at a train station. One or more luggage compartments 8 is provided in the train and preferably distributed over the rail cars 8.

A train server 2 is provided on board of the passenger train 1. The train server 2 includes a processor, memory, a wireless access point 9, such as a Wi-Fi hotspot and software for operating the train server. The wireless access point 9 provides for a wireless network in and around the train that can be accessed by a mobile device used by a passenger 6 in order to give passengers access to the train server 2. The luggage item 16 has an RFID tag 20 attached thereto.

The train server 2 is also provided with a wireless modem 15 for wirelessly connecting to a wide area network, such as via cells 14 of a mobile data network (e.g. 3G or 4 g) that connects to the Internet.

The train server 2 is configured for intermittent connection to the wide area network, i.e. it does not need to be continuously connected to the wide area network or to the Internet. One of the reasons for the train server 2 to connect to a wide area network is to establish data communication with a server that includes an online database having stored therein train configuration, train numbers seating arrangements, seat numbering, seat occupancy, train schedules, journey bookings, seat reservations, issued luggage RFID tags, etc. The train server 2 runs RFID hardware and the Software API.

The train server 2 is configured to attempt to connect with the server 2 regularly so as to update its own record of issued RFID luggage tags and the passengers 6 and their mobile devices 7 associated therewith. The train server 2 does not need to be on line (connected to the wider network/Internet) continuously in order to carry out its functionality properly.

A reader 23 for detecting and reading wireless non-contact use of radio-frequency tags (RFID reader) (RFID door frame scanner) is provided in or at the luggage compartment 11, preferably near a side or in the back of the luggage compartment 11. The RFID reader 23 is placed such that it can detect and read RFID tags 20 attached to a piece of luggage 16 that is placed in the luggage compartment 11. The RFID reader 23 is in an embodiment an active reader for reading passive tags 20.

FIG. 2 shows the train stopped next to a platform 10 of a railway station. FIG. 2 also shows the layout of the train 1 with railcars 8 and passenger seats 5 and luggage compartments 11 arranged therein.

FIG. 3 illustrates a diagram of components involved in an embodiment of the system and method. The luggage alert system is based on three different concept components, namely a preferably active RFID scanner 23 that can for example be arranged close to a doorframe of a luggage compartment 11. In other embodiments the RFID scanner 23 is arranged in or at another location that is suitable for detecting the presence of an RFID luggage tag in the luggage compartment 11. Another component is the RFID luggage tag 20 that can be in the form of an RFID chip sticker tag. A further component of the alarm system is a software product in the form of an app 30 on a mobile device 7 of a passenger 6 as a monitor.

FIG. 4 shows the system architecture according to an embodiment. The system architecture is based RFID tags 20 and an RFID reader 23. The RFID luggage tags 20 are in an embodiment passive tags. In an embodiment the RFID luggage tags 20 are tamper proof tags. In an embodiment the RFID luggage tags 20 are read only tags. The RFID reader 23 is connected to the train server 2 and the train server runs the RFID hardware/software API 22. The online app software back and 35 runs on the mobile device 7 and the off-line/online train app software 33 runs on the train server 2.

FIGS. 5 to 7 illustrate an example embodiment of a method and illustrate the operation of the system, the software product 30 and the passenger train 1. At the start of the usage flow the passenger 6 buys a ticket online using a personal computer and pays e.g. with a credit card. The user 6 connects to a server (not shown) that issues a ticket and issues an RFID tag 20 and sends the RFID tag 20 through the mail to the passenger. In the next step the passenger scans the unique optical (QR) code 37 that is enclosed with the RFID tag with his her mobile device 7 using the app 30. (As shown in FIG. 5, train tickets, for passenger train journeys can be provided with an individual optical machine readable code 27). The optical machine readable code 37 code provides the app 30 on the mobile device 7 with information identifying the RFID tag 20 and thus associates the mobile device 7 to the RFID tag 20. Next, the passenger attaches the matched RFID tag (sticker) to his or her suitcase or other piece of luggage 16. The mobile device 7 communicates its association with the RFID tag 20 to a (server not shown) via wide-area network. The train server 20 is in regular application with the server and thus informed of the issuance of an RFID tag 20 and of the mobile device 7 associated therewith. In an mother embodiment, the mobile device 7 informs the train server of its association with the RFIF luggage tag 20 upon establishing connection with the train server 2 via the local area wireless network provided by the wireless network access point 9.

Next, the passenger 6 boards a train and thereafter the passenger 6 places the luggage item 16 in the luggage compartment 11. During this process the RFID scanner 23 registers the RFID tag on the luggage and communicates this registration and the identification of the RFID tag 20 to the train server 2. Thereupon, the train server 2 checks in his database which mobile device 7 is associated with the identified RFID tag 20. After the train server 2 has looked up the associated mobile device 7, it sends via the wireless network a message to the mobile device 7 that the train server 2 has registered that an item of luggage 16 has been deposited in a particular luggage compartment 11. Upon receipt of this message from the train server 2 the app 30 on the mobile device 7 informs the user/passenger 6 to confirm the luggage deposit. When the user/passenger 6 confirms the deposit the app 30 sends a message via the wireless network to the train server 2 confirming the deposit. During this process or after this process the passenger 6 takes his or her seat.

The train server 2 monitors the presence of the RFID tag 20 until the RFID reader 23 ceases to detect the presence of the RFID tag 20. When the RFID reader 23 ceases to detect the presence of the RFID tag 20 the train server 2 sends a message to the mobile device 7 to inform the user that the luggage has been removed and the luggage item 16 is no longer considered as deposited in the luggage compartment 11. The app 30 on the mobile device 7 gives an alarm or an alert and asks the passenger 6 to confirm that he or she has removed his or her luggage item 16 from the luggage compartment 11. Thus, in case of removal of luggage, also when done by an unauthorized third party, the passenger 6 is alerted about the change of status. If the passenger 6 was indeed this embarking the passenger train 1 the app 30 on the mobile device 7 allows the passenger to confirm to the train server 2 that the luggage was a righteously removed.

At least one computer on board the passenger train 1 runs the train server 2.

The same or another computer runs the also offline/online in train app software on media server 37, the RFID hardware/software API and the online software app back end.

The various components of the system architecture communicate with one another via a local or wide area network, including wireless connections.

The online app software backend 35 provides online service to mobile devices 7 of passengers.

The mobile device 7, such as a smart phone is configured with a display and a camera. A luggage alarm app 30 is installed on the mobile device 7, and its code is stored on a memory of said mobile device 7 as a software product. The luggage alarm app 30 provides the functionality required for assisting a passenger in monitoring his or her luggage item 16 during a train journey.

The wireless network is in an embodiment a local network area such as e.g. a WiFi network and/or wide area network such as e.g. a 3G or a 4G network.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A passenger train, said passenger train comprising:
a train server on board of said passenger train, said server comprising a processor and a memory connected to said processor,
at least one luggage compartment,
an RFID reader arrangement connected to said train server and associated with said at least one luggage compartment and located at or in said at least one luggage compartment so as to be able to detect and read an RFID tag attached to a piece of luggage that is placed in said at least one luggage compartment,
a wireless access point connected to said train server and configured for establishing a local wireless network for allowing mobile devices of passengers to access to the train server,
a wireless modem for establishing a data connection to a wide area network, said train server being connected to said wireless modem, and said train server being configured to regularly connect to a booking server via said wide area network for accessing a database held by the booking server, which database contains information on luggage RFID tags that have been issued to a specific passenger and information on a mobile device associated with said specific passenger, or said train server being configured to receive a message from said mobile device after said mobile device connects to said wireless network informing the train server about said RFID luggage tag associated with said mobile device,
said train server being configured to register the piece of luggage as deposited in the luggage compartment associated with the RFID reader arrangement when the RFID reader arrangement concerned detects the presence of a luggage RFID tag issued to the specific passenger that is included in said database,
said train server being configured to send a message to the mobile device associated with said specific passenger when said RFID reader arrangement ceases to detect the presence of said luggage RFID tag issued to said specific passenger and associated with a deposited piece of luggage.

2. A passenger train according to claim 1, wherein said train server is configured to send a message to the mobile device of said specific passenger when an RFID tag issued to said specific passenger has been read by said RFID reader arrangement, said message preferably including information identifying the luggage compartment and/or its location and said train server preferably further being configured to include a request for said specific passenger to confirm deposit of the piece of luggage.

3. A passenger train according to claim 1, wherein said train server receives information from said booking database on the train journey booked by said specific passenger, and wherein said train server is configured to send a message to the mobile device of said specific passenger shortly before the train arrives at the destination of said specific passenger to remember said specific passenger to take his or her luggage item deposited in said luggage compartment with them when disembarking said passenger train.

4. A system for assisting a passenger monitoring a piece of luggage, said system comprising:
a server on a computer, said server comprising a processor and a memory connected to said processor,
said server being configured to issue RFID luggage tags to railway passengers, and said server including a database having issued RFID luggage tags stored therein,
a train server on board of a passenger train, said server comprising a processor and a memory connected to said processor,
an RFID reader arrangement connected to said train server and associated with said luggage compartment and located at or in said luggage compartment so as to be able to detect and read an RFID tag attached to the piece of luggage that is placed in said at least one luggage compartment,
a wireless access point on said passenger train and connected to said train server and configured for establishing a local wireless network for allowing mobile devices of passengers to access to the train server,
a wireless modem on said passenger train and connected to said train server and configured for establishing a data connection to said server via a wide area network,
said train server being configured to access said database via said wireless modem to obtain information on issued RFID tags and mobile devices of passengers associated therewith, or said train server being configured to receive a message from said mobile device after said mobile device connects to said wireless network informing the train server about said RFID luggage tag associated with said mobile device,
said train server being configured to send via said wireless network a message to the mobile device associated with said specific passenger that is associated with a detected RFID tag when said RFID reader arrangement ceases to detect the presence of said RFID tag.

5. A system according to claim 4, wherein said train server is configured to register the piece of luggage as deposited in the luggage compartment associated with the RFID reader arrangement when the RFID reader arrangement concerned detects the presence of a luggage RFID tag issued to a specific passenger that is included in said database.

* * * * *